Patented July 4, 1944

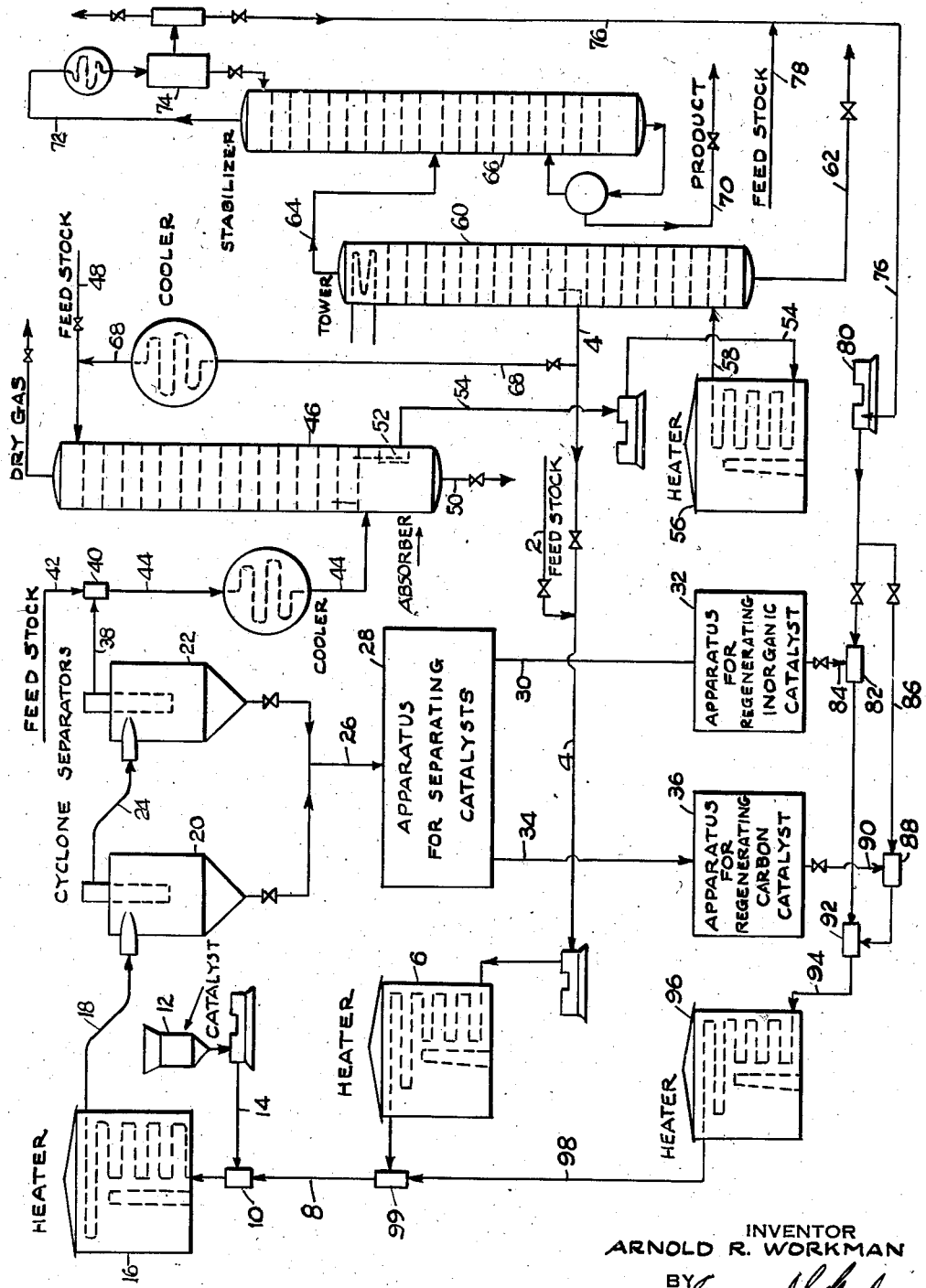

2,353,119

UNITED STATES PATENT OFFICE 2,353,119

CATALYTIC CONVERSION OF HYDROCARBONS WITH MIXED CATALYSTS

Arnold R. Workman, Malverne, N. Y., assignor to Cities Service Oil Company, New York, N. Y., a corporation of Pennsylvania Application December 4, 1941, Serial No. 421,563

7 Claims. (Cl. 196—52)

This invention relates to an improved catalytic process for the conversion of hydrocarbons of low antiknock characteristics into hydrocarbons having high antiknock properties suitable for aviation fuel. More particularly, the invention relates to the catalytic conversion of hydrocarbons by the use of a mixed catalyst or a mixture of catalysts. The catalytic conversion processes employed at the present time for the most part involve the use of inorganic catalytic materials consisting of various clays or especially prepared inorganic catalysts comprising mixtures of aluminum silicates with certain metal oxides. The fixed bed type of catalytic process usually involves the use of a preformed catalyst while the processes employing clays usually involve the use of a powdered clay or similar material.

One of the most important disadvantages of the present catalytic processes is the carbonization of the catalyst and its consequent deactivation and loss of effectiveness. In many instances the pores of the catalytic material are carbonized over and active surfaces are completely covered with a carbonaceous film. All processes therefore include the necessary elaborate provisions for burning out the carbonaceous deposit on the catalyst. Fixed catalyst beds are used for only a few minutes before they must be burned out, and in processes where the catalyst is suspended in the oil being cracked or converted the catalyst is almost always subjected to a burning operation before it is returned to the process. This latter burning procedure involves the handling of hundreds of tons of material daily in processes which include the use of from 400% to 500% of catalyst. Where such large proportions of the catalyst is used however, the percentage of carbonaceous deposit may amount to only 2% or 3%. However, in all known cases the catalyst is burned for revivification on every cycle.

The primary object of the present invention is to provide an improved catalytic process for converting hydrocarbon oils into high antiknock gasoline in which the objectionable carbonaceous deposit is greatly reduced and minimized.

A further object of the invention is to avoid a large part of the heavy burden involved in regenerating inorganic clay type catalyst in suspended catalyst type operations.

A further object of the invention is to provide an improved process for catalytically converting hydrocarbons of low antiknock value into hydrocarbons of high antiknock value by a combined dehydrogenation, polymerization and alkylation procedure in which a mixed catalyst is employed for effecting the conversion.

Accordingly, the improved process of the present invention comprises a relatively low pressure and low temperature catalytic conversion process in which a low antiknock hydrocarbon is mixed with a preheated active catalytic mixture comprising a substantial proportion of activated carbon and a substantial proportion of an inorganic catalyst of the clay type, subjecting the resulting mixture, with the catalyst in powdered form and in suspension, to a reaction temperature adapted to dehydrogenate and crack the hydrocarbon and at the same time effect polymerization, rearrangement and alkylation of the constituents to form high anti-knock products.

The improved process preferably includes other features such as the simultaneous or independent conversion of light distillate feed stocks such as $C_3$ and $C_4$ hydrocarbons, the use of such materials for suspending and preheating the catalyst and the recovery of $C_3$ and $C_4$ olefins for use in the process. The process also preferably includes the use of a low pressure absorption operation for eliminating $C_2$ and lower gaseous constituents from the conversion products, the separation of the carbon catalyst from the inorganic catalyst together with their separate regeneration and reuse in the process.

Other features, objects and advantages of the process of the present invention will be apparent to those skilled in the art from the following more detailed description thereof taken in connection with the accompanying drawing in which:

The single figure is a diagrammatic elevational view of an apparatus assembly particularly adapted for carrying out the improved process.

Referring to the drawing, the oil charging stock to be converted, such for example as gas oil, kerosene, naphtha and light distillates, or a mixture of two or more of these stocks, is introduced into the apparatus at a superatmospheric pressure of from 300 lbs. to 400 lbs. per square inch through a feed stock line 2, and conducted, through a connecting line 4 provided with a pump, directly into a pipe still heater 6 in which the stock is vaporized and heated to a temperature of from 900° F. to 960° F. The heating of the oil stock, for example, gas oil, in the pipe still heater 6 is only sufficient to vaporize the stock and bring it to the temperature referred to. The highly heated vapors are conducted from the heater 6 into a line 8 and intimately mingled with a powdered catalyst comprising a mixture of from 10% to 40% of activated carbon or charcoal and from 90% to 60% of an activated inorganic catalyst of the clay type in a mixer 10, the catalyst being supplied from a hopper 12 through a line 14 containing a catalyst pump as shown. The oil vapors and mingled catalyst preferably in proportions of about 1 to 1 by weight, are conducted through a reaction furnace 16 in which the mixture is merely maintained at a reaction temperature of from 885° to about 970° F. for a period of from three to ten minutes. The percentage of catalyst may be as low as 10% by weight.

The conversion products containing the suspended catalyst are conducted from the pipe still heater 16 through a transfer line 18 and passed into the first of a series of cyclone separators 20 and 22 which are adapted to separate most if not all of the catalytic materials from the hydrocarbon vapors. The major part of the catalytic material will be separated in the cyclone separator 20 while the vapors and the remainder of the catalyst passes on through vapor line 24 to the second separator 22 for further separation. The partially spent catalyst separated out in the elements 20 and 22 passes through a line 26 to apparatus for effecting the separation between the carbon and the inorganic catalyst designated generally at 28.

The separation of the two catalytic materials in the apparatus 28 is done so that these materials can be more effectively revivified for reuse in the process. The separation of the carbon catalyst from the inorganic clay type catalyst may be accomplished by well-known means such as classifiers, precipitators or filters, for example the carbon catalyst separates readily from the clay type catalyst in a coal-washing machine by passing the catalyst mixture with water through the machine in which the clay settles out first and the carbon floats off and is separately collected. In this operation the separated materials are collected in filter presses, dried and sent to the respective regenerating apparatus 32 and 36. Coal-washing machines operate on the principle of the Spitzkasten which consists of a series of conical boxes in which each succeeding box is larger and deeper than the first. In addition to the water passed into such a machine with the materials to be separated, a stream of water is also preferably introduced into the apex of each box to effect a sharper classification. The catalytic materials may also be separated by well-known electric separators because the carbon is an electrical conductor while the clay is not. The inorganic catalyst separated by the apparatus 28 is conducted from the apparatus 28 through a line 30 to apparatus 32 for regeneration, while the separated carbon catalyst is conducted through a line 34 to an apparatus 36 for regenerating the carbon catalyst. Well-known apparatus and methods may be used for reactivating both catalysts. The inorganic, clay-type catalyst may be reactivated in the apparatus 32 at temperatures of about 1100° F. or slightly lower by intimate contact with air or oxygen to the extent of about 15% of that required for burning out carbonaceous material and reactivating the catalyst. Sometimes a small amount of steam is required along with the air unless the air itself is sufficiently humid. The carbon catalyst in the apparatus 36 may be reactivated at temperatures of from 1100° to 1250° F. by intimately contacting the carbon catalyst with superheated steam, care being taken to avoid substantial oxidation of the carbon.

The mixture of catalytic materials removed from the line 26 need not be separated in the apparatus 28 and reactivated in the apparatus 32 and 36 on each cycle, but may be substantially regenerated together at temperatures of about 1150° F. by intimate contact with a relatively small proportion of superheated steam. Such revivified catalyst mixture may be sent directly to the hopper 12 or utilized in a manner described hereinafter. Separation of the carbon catalyst from the inorganic catalyst in the apparatus 28 is primarily for the purpose of separately regenerating the inorganic catalyst which is necessary in many cases only periodically. The presence of a relatively large proportion of the activated carbon catalyst along with the activated inorganic catalyst during the conversion operation appears to inhibit carbon formation and to substantially avoid carbonization of the inorganic catalyst, which is one of the chief difficulties in the present catalytic conversion processes using inorganic catalytic materials exclusively. The catalyst is preferably supplied hot and dry to a dry oil vapor to be converted.

The conversion products resulting from the catalytic conversion in the pipe still heater 16, in vapor form and free of catalytic material, or substantially so, are conducted from the cyclone separator 22 through a vapor line 38 into a mixing nozzle 40 in which the vapors are cooled to a substantially low temperature by the introduction of relatively cool feed stock such as gas oil or kerosene introduced into the nozzle 40 through a line 42. The resulting chilled products at a temperature of from 150° to 250° F. are conducted through a line 44, and a cooler therein, into the lower portion of a low pressure absorber 46. The pressure in the absorber 46 is preferably only about 10 lbs. per square inch and is maintained by a valve in the "dry" gas discharge line at the top of the absorber. The pressures in the preceding parts of the apparatus including the cyclone separators and the pipe still heater 16 are as low as possible consistent with the maintenance of flow and the back-pressure of about 10 lbs. per square inch in the absorber 46.

The liquid, vapor and gaseous constituents introduced into the absorber through the line 44 are preferably at a temperature of approximately 80° to 100° F. At the same time an absorption oil such as a gas oil distillate or other feed stock, higher boiling than gasoline, is introduced into the top of the absorber through a line 48, in sufficient quantity to absorb substantially all of the $C_3$ and higher molecular weight hydrocarbons. The liquid constituents introduced into the bottom of the absorber 46 from the line 44 pass into a settling section in which any solid particles of the catalyst are collected and removed with a portion of the oil through a valved line 50. However, the major portion of this liquid material overflows into a trap 52 where it is collected along with the absorption oil and the constituents absorbed in the absorber withdrawn through a line 54 having a pump therein, and forced at a pressure of about 250 lbs. per square inch through the heating coil of a pipe still heater 56 for the purpose of heating the oil mixture to a temperature sufficient to fractionate out the gasoline and other hydrocarbons up to and including gas-oil constituents, the heated products being conducted through a transfer line 58 into the lower portion of a fractionating tower 60. The oil removed through line 50 may be freed of catalyst, as by filtration and then introduced into the line 64.

The fractionation carried out in the tower 60 is preferably conducted in such a manner that the residual constituents of higher boiling point than gas oil are removed through a valved line 62, while end point gasoline constituents and lower boiling materials including the C₃ hydrocarbons are removed overhead through a vapor line 64 and introduced into the midportion of a stabilizer tower 66. The intermediate boiling constituents comprising gas-oil and kerosene boiling range hydrocarbons may be withdrawn as a side stream into line 4 which connects directly with the pipe still heater 6. The fractionation in the tower 60 may be controlled by cooling the top of the tower to produce the desired amount of refluxing. The side stream withdrawn through the valved line 4 may be used as charging stock for the pipe still furnace 6, or any portion or all of this side stream may be used as absorption oil in the absorber 46 by conducting it through a valved line 68 and a cooler therein directly into the line 48. A portion of the side stream in line 68, cooled or not, may be used in line 42.

The vapors introduced into the stabilizer tower 66 are fractionated therein at a pressure of about 175 lbs. per square inch to produce a bottoms product comprising a stabilized end point gasoline which is removed through a reboiler and discharged through a valved line 70. The vapors produced in the stabilizer are taken overhead through a vapor line 72, subjected to condensing conditions, and the resulting condensate collected in a receiver 74, from which a portion may be returned to the top of the stabilizer to provide the desired refluxing conditions. The vapors in the line 72 comprise the butane in excess of that required in the gasoline product, isobutane, butylene, propylene and propane. Most of these constituents may be condensed and the uncondensed gas discharged from the system, but the whole mixture, which contains very little C₂ and lower gases, is preferably returned to the process through a valved line 76 and if desired additional light distillate feed stock such as the butanes or the butylenes, propane or propylene, may be introduced into the line 76 from a feed stock supply line 78.

The stock in the line 76 may be employed as a charging stock for the process or as a carrier material for the catalyst, or both. In either case this stock, which may be merely butane, isobutane, or the mixture taken from the receiver 74, is placed under a pressure of about 500 lbs. per square inch by means of a pump or compressor 80, and a portion of the mixture conducted into a mixing nozzle 82 which is supplied with activated inorganic catalyst from the regeneration apparatus 32 through a valved supply line 84. Another portion of the stock in the line 76 is conducted through a valved branch line 86 into a mixing nozzle 88 while activated carbon catalyst from the apparatus 36 is supplied thereto through a valved supply line 90.

The catalytic materials introduced into the mixers 82 and 88 are intimately mingled with the light feed stock and the resulting mixtures conducted into a further mixer 92 so that the entire stock supplied through the line 76 is loaded with the carbon and inorganic catalytic materials from the lines 84 and 90. This mixture of light stock and catalyst is conducted through a line 94 into a pipe still furnace 96 in which the mixture is heated rapidly to a temperature of from 900° to 960° F. for the purpose of supplying the catalytic materials to the process in a highly heated and activated state. Carbonization of the catalytic materials is greatly reduced where these materials are preheated to a temperature above that of oil condensation. The vaporized light stock containing the suspended catalyst is discharged from the pipe still furnace 96 through a transfer line 98 and mixed directly with the highly heated stock from the pipe still furnace 6 in a mixer 99.

The catalytic material supplied through the line 98 to the high temperature vapors from the pipe still heater 6 may replace all or a part of the catalyst initially supplied through the line 14. The hopper 12 therefore may be used only in starting up the apparatus or for supplying a small proportion of fresh catalyst mixture to the system. Fresh catalyst however may be supplied to either or both of the mixers 82 and 88, and catalytic material may be recycled to these mixers directly from the line 26. The catalyst from the line 26 however is preferably regenerated in apparatus such as the apparatus 36, with superheated steam, without burning any of the carbon. At intervals, however, the inorganic catalyst is preferably separated out and regenerated in the apparatus 32 in the manner described above. An insulated reaction chamber may be used in place of, or along with the reaction heater 16, the reaction time however being preferably about five minutes for gas oil, kerosene and naphtha stocks.

While the light stock supplied through the line 76 and used as a catalyst carrier for supplying the catalyst in a highly heated aerated condition to the process is advantageous, a preferred form of the process includes the simultaneous conversion, polymerization and alkylation of the stock heated in the pipe still furnace 6 with the light stock supplied through the line 76. In such an operation the C₃ and C₄ hydrocarbon mixture obtained from the receiver 74 and containing approximately 65% of olefin hydrocarbons, is supplied through the line 76 to pick up the inorganic catalyst and carbon catalyst to produce a rather concentrated suspension or "aerated" mixture in the line 94. This suspended catalyst and light stock is heated to a temperature of from 860° to 970° F. in the pipe still heater 96, while a gas-oil type feed stock is simultaneously heated to approximately the same temperature in the pipe still heater 6. The transfer line products from the two heaters are intimately mixed in the mixer 99 after which the whole mixture at reaction temperature and containing about 80% by weight of the catalyst mixture is reacted in the pipe still heater 16 for a period of about seven minutes. The activated carbon catalyst in the presence of the clay, in this operation, dehydrogenates the gas oil constituents and thereby promotes cracking, while the clay type catalyst in the presence of the activated carbon promotes polymerization and alkylation reactions, so that the light hydrocarbons supplied through the line 76 are effectively interacted with the cracked products of the gas oil stock. The gasoline produced in an operation of this type will have an octane number of about 85 C. F. R. by the motor method. In the cracking of gas-oil type stock alone in the reaction heater 16 with the same type catalyst mixture the octane number of the gasoline is slightly lower or about 81.

When it is desired to convert light hydrocarbons or constituents such as $C_3$ and $C_4$, these materials may be supplied exclusively through lines 76 and 78 or they may be divided so that some of the feed stock is supplied through the line 2. Butylene and isobutylene may be subjected to polymerization or used for alkylation reactions with paraffins directly in the furnace 96, and the resulting products passed directly to the absorber 46 or inter-reacted with other stock supplied to the heater 6 in the manner described above. Propane, butane or isobutane may be alkylated with propylene or a butylene to produce iso or branched chain hydrocarbons.

High boiling refractory stocks are preferably eliminated from the conversion system as for example through the line 62, and if desired the entire feed stock for the process with the possible exception of the light hydrocarbons from receiver 74 may be fresh straight run charging stocks introduced through lines 2 or 78. Kerosene or gas oil type stocks may of course be supplied through lines 42 or 48 or both and recovered in the tower 60 so that they will be in fact supplied to the pipe still heater 6 through the line 4.

The activated carbon catalyst used in the process may be obtained from any source and may comprise powdered activated charcoal or some of the carbon which may be produced in the conversion operation after activation. The inorganic catalyst which is preferably of the clay type may be products commonly known as bauxite, Florida clay, natural aluminum hydrosilicates, fuller's earth, and similar materials which are activated, but which may contain a very small percentage of combined water. Activation of such materials with humid air or air and steam at fairly high temperatures appears to produce an inorganic material of an acidic nature which promotes alkylation and polymerization reactions. The catalyst mixture should comprise about 10% by weight of activated carbon to be fully effective.

While the nature of the action of the activated mixed catalyst is not definitely known, one explanation involves the idea that the activated carbon in the presence of the clay dehydrogenates paraffinic hydrocarbons and promotes cracking or cleavage where the chain is long, while at the same time the newly formed hydrogen ions produced from the hydrogen of the dehydrogenation, in the presence of the clay and carbon catalysts activate the olefins, such as the $C_3$ and $C_4$ hydrocarbons, and promote their polymerizations to form dimers which may be hydrogenated directly by the hydrogen produced in the reaction. The activated clay type catalyst furthermore promotes the alkylation reactions especially in conjunction with the activated carbon which aids in the shifting of the hydrogen from the saturated hydrocarbon to be alkylated. In the production of hydrogen ions as referred to above, and the activation of olefins, it may be that the olefin is activated by the hydrogen ions to form a complex. In any case the catalyst mixture containing a substantial percentage of activated carbon is very effective in its combined action.

Various changes and modifications of the improved process may be made without departing from the spirit and scope of the invention as defined by the accompanying claims, by which the invention is defined.

Having described the invention in its preferred form, what is claimed as new is:

1. The process of catalytically converting hydrocarbon oils, which comprises mingling a hydrocarbon oil distillate with approximately an equal weight of powdered catalytic materials comprising a mixture of approximately 20% of activated carbon and approximately 80% of active inorganic clay type catalytic material, passing the mixture of hydrocarbon distillate and catalytic materials through a reaction zone in which the mixture is subjected to a temperature of from 860° F. to 970° F. to effect dehydrogenation, alkylation and polymerization reactions and produce a substantial proportion of constituents boiling in the gasoline range which are of relatively high antiknock value, passing the mixture of reaction products and catalytic materials into a separating zone in which the catalytic materials are separated from the reaction products, recovering the gasoline range materials from the reaction products, separating the catalytic materials removed from said reaction products into a carbon fraction and an inorganic fraction, separately regenerating said fractions for reuse in the process, mingling the regenerated catalytic materials with a light hydrocarbon distillate containing substantial proportions of olefins, heating the resulting mixture to a temperature approximating the reaction temperature and cycling the resulting heated mixture through the reaction zone with the distillate charging stock passed therethrough to supply the catalytic materials for the conversion of said distillate charging stock and said light distillate to constituents boiling in the gasoline range.

2. The process as defined by claim 1 in which the reaction products are recovered at low pressure, cooled to substantially atmospheric temperature and passed into the lower portion of a low pressure absorber in which $C_2$ and lower gases are eliminated and $C_3$ and higher molecular weight constituents are recovered in a rich absorption medium, and separating $C_3$ and $C_4$ hydrocarbons from said medium to supply at least in part said light hydrocarbon distillate.

3. The process of catalytically converting hydrocarbon oils, which comprises mingling a hydrocarbon oil distillate with approximately an equal weight of powdered catalytic materials comprising a mixture of from 10 to 40% of activated carbon and from 90 to 60% of active inorganic clay type catalytic material, passing the mixture of hydrocarbon distillate and suspended catalytic materials through a reaction zone in which the mixture is subjected to a reaction temperature adapted to effect dehydrogenation, alkylation and polymerization reactions and produce a substantial proportion of constituents boiling in the gasoline range which are of relatively high antiknock value, passing the mixture of reaction products and catalytic materials into a separating zone in which the catalytic materials are separated from the reaction products, recovering the gasoline range materials from the reaction products, separating the catalytic materials removed from said reaction products into a carbon fraction and an inorganic fraction, separately regenerating said fractions for reuse in the process, and returning the regenerated catalyst fractions to the process with additional hydrocarbon distillate charging stock therefor.

4. A process for the conversion of hydrocarbon oils, comprising the steps of reacting a hydrocarbon oil distillate to be converted with a substantial proportion of a mixture of powdered catalytic materials comprising from 10% to 40% of activated carbon and from 90% to 60% of an inorganic active catalyst of the clay type, conducting the conversion reaction in a reaction zone in which the hydrocarbon distillate is converted at a temperature of from 860° F. to 970° F. by a combination of reactions including dehydrogenation, alkylation and polymerization by which a substantial proportion of constituents boiling in the gasoline range and having relatively high antiknock properties are produced, passing the mixture of reaction products from the reaction zone, and recovering the constituents boiling in the gasoline range from the reaction products.

5. A process as defined by claim 4 in which the mixture of catalytic materials is supplied to the reaction zone in suspension in a light hydrocarbon vapor comprising $C_3$ and $C_4$ hydrocarbons which enter into the reaction in said zone.

6. In a process for the conversion of hydrocarbon oils in which a hydrocarbon distillate is converted by reacting the distillate with a solid conversion catalyst, the improvement which comprises reacting the hydrocarbon oil distillate to be converted with a substantial proportion of a finely divided solid catalytic material comprising a mixture consisting mostly of an inorganic active catalyst of the clay type and a substantial proportion of activated carbon by passing the hydrocarbon distillate together with the finely divided catalytic mixture through a reaction zone in which the hydrocarbon distillate is converted in contact with the catalytic mixture at a reaction temperature adapted to effect conversion of the distillate into a reaction product containing a substantial proportion of constituents boiling in the gasoline range and having relatively high antiknock properties, passing the mixture of reaction products and catalytic materials into a separating zone in which the catalytic materials are separated from the reaction products, recovering the constituents boiling in the gasoline range from the reaction products, separating the carbon catalyst from the inorganic catalyst of the catalyst materials separated from the reaction products and separately regenerating them, and returning the separately regenerated catalysts to the reaction zone.

7. In a continuous process for the conversion of hydrocarbon oils in which a hydrocarbon distillate is converted by reacting the distillate with a solid conversion catalyst, the improvement which comprises reacting the hydrocarbon oil distillate to be converted with a substantial proportion of a finely divided solid catalytic material comprising a mixture consisting mostly of an inorganic active catalyst of the clay type and a substantial proportion of activated carbon by passing the hydrocarbon distillate together with the finely divided catalytic mixture through a reaction zone maintained at a relatively low pressure in which the hydrocarbon distillate is converted in contact with the catalytic mixture at a reaction temperature of from 885° to 970° F. adapted to effect conversion of the distillate into a reaction product containing a substantial proportion of constituents boiling in the gasoline range and having relatively high antiknock properties, passing the mixture of reaction products and catalytic materials into a separating zone in which the catalytic materials are separated from the reaction products, recovering the constituents boiling in the gasoline range from the reaction products, separating the carbon catalyst from the inorganic catalyst of the catalyst materials separated from the reaction products and separately regenerating them, and returning the separately regenerated catalysts to the reaction zone.

ARNOLD R. WORKMAN.